United States Patent
Choi et al.

(10) Patent No.: US 8,724,498 B2
(45) Date of Patent: May 13, 2014

(54) METHODS, SYSTEMS, AND COMPUTER READABLE MEDIA FOR PERFORMING LONG TERM EVOLUTION (LTE) CHANNEL DELINEATION

(75) Inventors: Jong Kwan Choi, Santa Clara, CA (US); Ram Asokan, Cary, NC (US)

(73) Assignee: IXIA, Calabasas, CA (US)

( * ) Notice: Subject to any disclaimer, the term of this patent is extended or adjusted under 35 U.S.C. 154(b) by 102 days.

(21) Appl. No.: 13/396,577

(22) Filed: Feb. 14, 2012

(65) Prior Publication Data

US 2013/0208603 A1 Aug. 15, 2013

(51) Int. Cl.
*G01R 31/08* (2006.01)

(52) U.S. Cl.
USPC ............ 370/252; 370/241; 455/423; 455/509

(58) Field of Classification Search
USPC ........................... 370/252, 241; 455/423, 509
See application file for complete search history.

(56) References Cited

U.S. PATENT DOCUMENTS

| | | | |
|---|---|---|---|
| 5,561,841 A | 10/1996 | Markus | |
| 5,850,386 A | 12/1998 | Anderson et al. | |
| 6,125,072 A | 9/2000 | Wu | |
| 6,771,957 B2 | 8/2004 | Chitrapu | |
| 6,996,772 B2 | 2/2006 | Justice et al. | |
| 7,543,054 B1 | 6/2009 | Bansod et al. | |
| 7,765,313 B2 | 7/2010 | Jain et al. | |
| 8,601,585 B2 | 12/2013 | Beddoe et al. | |
| 2006/0276195 A1 | 12/2006 | Nordling | |
| 2009/0052473 A1 | 2/2009 | Choi et al. | |
| 2009/0077456 A1 | 3/2009 | Pi et al. | |
| 2009/0077457 A1 | 3/2009 | Ramesh et al. | |
| 2009/0100300 A1 | 4/2009 | Kim et al. | |
| 2009/0196244 A1 | 8/2009 | Chun et al. | |
| 2009/0245187 A1 | 10/2009 | Nam et al. | |
| 2010/0075678 A1 | 3/2010 | Akman et al. | |
| 2010/0165847 A1 | 7/2010 | Kamuf et al. | |
| 2010/0184447 A1* | 7/2010 | Miki et al. ..................... | 455/450 |
| 2010/0195743 A1* | 8/2010 | Barsoum et al. .............. | 375/242 |
| 2010/0272011 A1 | 10/2010 | Palanki et al. | |
| 2010/0290371 A1* | 11/2010 | Beale ............................ | 370/280 |
| 2010/0303011 A1 | 12/2010 | Pan et al. | |
| 2011/0032925 A1 | 2/2011 | Lee et al. | |
| 2011/0044196 A1 | 2/2011 | Ishii | |
| 2011/0076962 A1 | 3/2011 | Chen et al. | |
| 2011/0086659 A1* | 4/2011 | Yoon et al. .................... | 455/509 |
| 2011/0119552 A1 | 5/2011 | Park et al. | |

(Continued)

OTHER PUBLICATIONS

Commonly assigned, co-pending U.S. Appl. No. 13/447,160 for "Methods, Systems, and Computer Readable Media for Heuristics-Based Adaptive Protocol Parsing," (unpublished, filed Apr. 13, 2012).

(Continued)

*Primary Examiner* — Hassan Kizou
*Assistant Examiner* — Deepa Belur
(74) *Attorney, Agent, or Firm* — Jenkins, Wilson, Taylor & Hunt, P.A.

(57) ABSTRACT

Methods, systems, and computer readable media for performing long term evolution (LTE) channel delineation are disclosed. According to one method, the method includes storing a plurality of channel delineation maps in memory. The method further includes receiving downlink data from an LTE radio link. The method also includes identifying one of the channel delineation maps using the received data. The method further includes performing channel delineation on the data using a preconfigured channel delineation map.

22 Claims, 9 Drawing Sheets

(56) References Cited

U.S. PATENT DOCUMENTS

| | | | |
|---|---|---|---|
| 2011/0158333 A1 | 6/2011 | Nakano et al. | |
| 2011/0170439 A1* | 7/2011 | Miki et al. | 370/252 |
| 2011/0206151 A1* | 8/2011 | McCloud et al. | 375/267 |
| 2011/0235586 A1 | 9/2011 | Han et al. | |
| 2012/0033650 A1* | 2/2012 | Ahn et al. | 370/336 |
| 2012/0039246 A1 | 2/2012 | Zhang et al. | |
| 2012/0042226 A1 | 2/2012 | Ramesh et al. | |
| 2012/0051271 A1* | 3/2012 | Beale | 370/280 |
| 2012/0063384 A1* | 3/2012 | Bi et al. | 370/315 |
| 2012/0093249 A1 | 4/2012 | Sun et al. | |
| 2012/0094651 A1 | 4/2012 | Chun et al. | |
| 2012/0150521 A1 | 6/2012 | Balkwill | |
| 2012/0170524 A1 | 7/2012 | Ren et al. | |
| 2012/0204081 A1 | 8/2012 | Fresia et al. | |
| 2013/0010724 A1 | 1/2013 | Han et al. | |
| 2013/0024753 A1 | 1/2013 | Masuda et al. | |
| 2013/0034062 A1 | 2/2013 | Seo et al. | |
| 2013/0058240 A1 | 3/2013 | Kim et al. | |
| 2013/0058294 A1 | 3/2013 | Miki et al. | |
| 2013/0058306 A1 | 3/2013 | Noh et al. | |
| 2013/0060735 A1 | 3/2013 | Haddy et al. | |
| 2013/0070689 A1 | 3/2013 | Liu et al. | |
| 2013/0070690 A1 | 3/2013 | Moon et al. | |
| 2013/0088973 A1 | 4/2013 | Yang et al. | |
| 2013/0115987 A1 | 5/2013 | Yoo et al. | |
| 2013/0121168 A1 | 5/2013 | Luo et al. | |
| 2013/0121295 A1 | 5/2013 | Saito et al. | |
| 2013/0155867 A1 | 6/2013 | Asokan et al. | |
| 2013/0155872 A1 | 6/2013 | Subramanian et al. | |
| 2013/0155878 A1 | 6/2013 | Deng et al. | |
| 2013/0184023 A1 | 7/2013 | Asokan et al. | |
| 2013/0208600 A1 | 8/2013 | Campbell et al. | |
| 2013/0227092 A1 | 8/2013 | Maestas | |
| 2013/0227233 A1 | 8/2013 | Asokan | |
| 2013/0275606 A1 | 10/2013 | Iyer | |

OTHER PUBLICATIONS

Commonly assigned, co-pending U.S. Appl. No. 13/431,975 for "Methods, Systems, and Computer Readable Media for Dynamically Controlling a Turbo Decoding Process in a Long Term Evolution (LTE) Multi-User Equipment (UE) Traffic Simulator," (unpublished, filed Mar. 28, 2012).

Commonly assigned, co-pending U.S. Appl. No. 13/429,384 for "Scalable Architecture for Multiple User Equipment (Multi-UE) Simulation," (unpublished, filed Mar. 25, 2012).

Commonly assigned, co-pending U.S. Appl. No. 13/408,787 for "Methods, Systems, and Computer Readable Media for Integrated Sub-Block Interleaving and Rate Matching," (unpublished, filed Feb. 29, 2012).

Commonly assigned, co-pending U.S. Appl. No. 13/371,389 for "Methods, Traffic Simulators, and Computer Readable Media for Validating Long Term Evolution (LTE) Code Blocks and Tansport Blocks," (unpublished, filed Feb. 10, 2012).

Commonly assigned, co-pending U.S. Appl. No. 13/352,058 for "Methods, Systems, and Computer Readable Media for Long Term Evolution (LTE) Uplink Data Processing," (unpublished, filed Jan. 17, 2012).

Commonly assigned, co-pending U.S. Appl. No. 13/336,005 for "Methods, Systems, and Computer Readable Media for Reducing the Impact of False Downlink Control Information (DCI) Detection in Long Term Evolution (LTE) Physical Downlink Control Channel (PDCCH) Data," (unpublished, filed Dec. 23, 2011.

Commonly assigned, co-pending U.S. Appl. No. 13/326,264 for "Methods, Systems, and Computer Readable Media for Improved Long Term Evolution (LTE) Hybrid Automatic Repeat Request (HARQ) Processing," (unpublished, filed Dec. 14, 2011).

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9)," 3GPP TS 36.300 v9.9.0 (Dec. 2011).

"3rd Generation Partnership Project; Universal Mobile Telecommunications System (UMTS); Evolved Universal Terrestrial Radio Access (E-UTRA); Physical layer for relaying operation (Release 10)," 3GPP TS 36.216, v10.3.1 (Sep. 2011).

"3rd Generation Partnership Project; Technical Specification Group Radio Access Network; Evolved Universal Terrestrial Radio Access (E-UTRA); Physical layer procedures (Release 10)," 3GPP TS 36.213, V10.3.0 (Sep. 2011).

"3rd Generation Partnership Project; Technical Specification Group Radio Access Network; Evolved Universal Terrestrial Radio Access (E-UTRA); Multiplexing and channel coding (Release 10)," 3GPP TS 36.212, V10.3.0 (Sep. 2011).

"3rd Generation Partnership Project; Technical Specification Group Radio Access Network; Evolved Universal Terrestrial Radio Access (E-UTRA); Physical Channels and Modulation (Release 10)," 3GPP TS 36.211, V10.3.0 (Sep. 2011).

"LTE; Evolved Universal Terrestrial Radio Access (E-UTRA); Physical layer; Measurements (3GPP TS 36.214 version 10.1.0 Release 10)," ETSI TS 136 214, V10.1.0 (Apr. 2011).

Third Generation Partnership Project, "Technical Specification Group Radio Access Network; Evolved Universal Terrestrial Radio Access (E-UTRA); LTE Physical Layer; General Description," 3GPP TS 36.201 v10.0.0, Release 10 (Dec. 2010).

"IxCatapult Chassis," http://www.ixiacom.com/products/display?skey=ch_ixcatapult, pp. 1-2 (Downloaded from the Internet Apr. 14, 2010).

"Wireless Network Testing," Ixia, 915-2623-01 Rev A, pp. 1-18 (Jan. 2010).

"Wireless Network Testing," Ixia, 915-2622-01 Rev A, pp. 1-16 (Jan. 2010).

"3rd Generation Partnership Project; Technical Specification Group Radio Access Network; Requirements for Evolved UTRA (E-UTRA) and Evolved UTRAN (E-UTRAN) (Release 9)," 3GPP TR 25.913, v9.0.0 (Dec. 2009).

"PDCCH Blind Decoding," PDCCH Decoding Example, http://www.steepestascent.com, pp. 1-6 (Copyright 2009-2011, dowloaded from the Internet Dec. 4, 2011).

Non-Final Office Action for U.S. Appl. No. 13/447,160 (Nov. 8, 2013).

Non-Final Office Action for U.S. Appl. No. 13/431,975 (Oct. 10, 2013).

Non-Final Office Action for U.S. Appl. No. 13/326,264 (Oct. 10, 2013).

Non-Final Office Action for U.S. Appl. No. 13/154,166 (Aug. 19, 2013).

Radio Electronics, "LTE CA: Carrier Aggregation Tutorial," pp. 1-7 http://www.radio-electronics.com/info/cellulartelecomms/lte-long-term-evolution/4g-lte-advanced-carrier-channel-aggregation.php (Printed from the Internet Aug. 7, 2013).

Share Technote, "Frame Structure—Downlink,"pp. 1-11 http://www.sharetechnote.com/html/FrameStructure_DL.html#PCFICH (Printed from the Internet Aug. 7, 2013).

Non-Final Office Action for U.S. Appl. No. 13/336,005 (Jul. 2, 2013).

Non-Final Office Action for U.S. Appl. No. 13/431,975 (May 24, 2013).

Commonly assigned, co-pending U.S. Appl. No. 13/835,658 for "Methods, Systems, and Computer Readable Media for Utilizing Adaptive Symbol Processing in a Multiple User Equipment (Multi-UE) Simulator," (unpublished, filed Mar. 15, 2013).

3rd Generation Partnership Project, "Technical Specification Group Radio Access Network; Evolved Universal Terrestrial Radio Access (E-UTRA); Physical layer procedures (Release 11)," 3GPP TS 36.213, V11.2.0, pp. 1-173 (Feb. 2013).

3rd Generation Partnership Project, "Technical Specification Group Radio Access Network; Evolved Universal Terrestrial Radio Access (E-UTRA); Multiplexing and channel coding (Release 11)," 3GPP TS 36.212, V11.2.0, pp. 1-18 (Feb. 2013).

3rd Generation Partnership Project, "Technical Specification Group Radio Access Network; Evolved Universal Terrestrial Radio Access (E-UTRA); Physical Channels and Modulation (Release 11)," 3GPP TS 36.211, V11.2.0, pp. 1-109 (Feb. 2013).

3rd Generation Partnership Project, "Technical Specification Group Radio Access Network; Evolved Universal Terrestrial Radio Access

(56) References Cited

OTHER PUBLICATIONS (E-UTRA); Physical layer; Measurements (Release 11)," 3GPP TS 26.214, V11.1.0, pp. 1-14 (Dec. 2012).

3rd Generation Partnership Project, "Technical Specification Group Radio Access Network; Evolved Universal Terrestrial Radio Access (E-UTRA); LTE physical layer; General description (Release 11)," 3GPP TS 36.201, V11.1.0, pp. 1-13 (Dec. 2012).

3rd Generation Partnership Project, "Technical Specification Group Radio Access Network; Evolved Universal Terrestrial Radio Access (E-UTRA); Physical layer for relaying operation (Release 11)," 3GPP TS 36.215, V11.0.0, pp. 1-16 (Sep. 2012).

Xiao et al., "IMS Network Deployment Cost Optimization Based on Flow-Based Traffic Model," IEEE/IFIP Network Operations and Management Symposium—NOMS 2010, pp. 232-239 (2010).

"Network Toopology," http://web.archive.org/web/20081219235147/http://en.wikipedia.org/wiki/Network_topology, pp. 1-9 (Dec. 19, 2008).

Final Office Action for U.S. Appl. No. 13/447,160 (Mar. 18, 2014).
Non-Final Office Action for U.S. Appl. No. 13/429,384 (Mar. 13, 2014).
Final Office Action for U.S. Appl. No. 13/154,166 (Mar. 3, 2014).
Final Office Action for U.S. Appl. No. 13/336,005 (Feb. 26, 2014).
Interview Summary for U.S. Appl. No. 13/447,160 (Feb. 25, 2014).
Final Office Action for U.S. Appl. No. 13/326,264 (Feb. 20, 2014).
Non-Final Office Action for U.S. Appl. No. 13/408,787 (Feb. 3, 2014).
Notice of Allowance and Fee(s) Due for U.S. Appl. No. 13/431,975 (Jan. 22, 2014).

3rd Generation Partnership Project, "Technical Specification Group Radio Access Network; Evolved Universal Terrestrial Radio Access (E-UTRA); Physical layer for relaying operation (Release 11)," 3GPP TS 36.216, V11.0.0, pp. 1-16 (Sep. 2012).

Ikuno et al., "System level simulation of LTE networks," 2010 IEEE 71st Vehicular Technology Conference: VTC2010-Spring, (May 16-19, 2010).

Abbes et al., "Protocol Analysis in Intrusion Detection Using Decision Tree," IEEE, Proceedings of the International Conference on Information Technology: Coding and Computing (ITCC'04), pp. 1-5 (2004).

\* cited by examiner

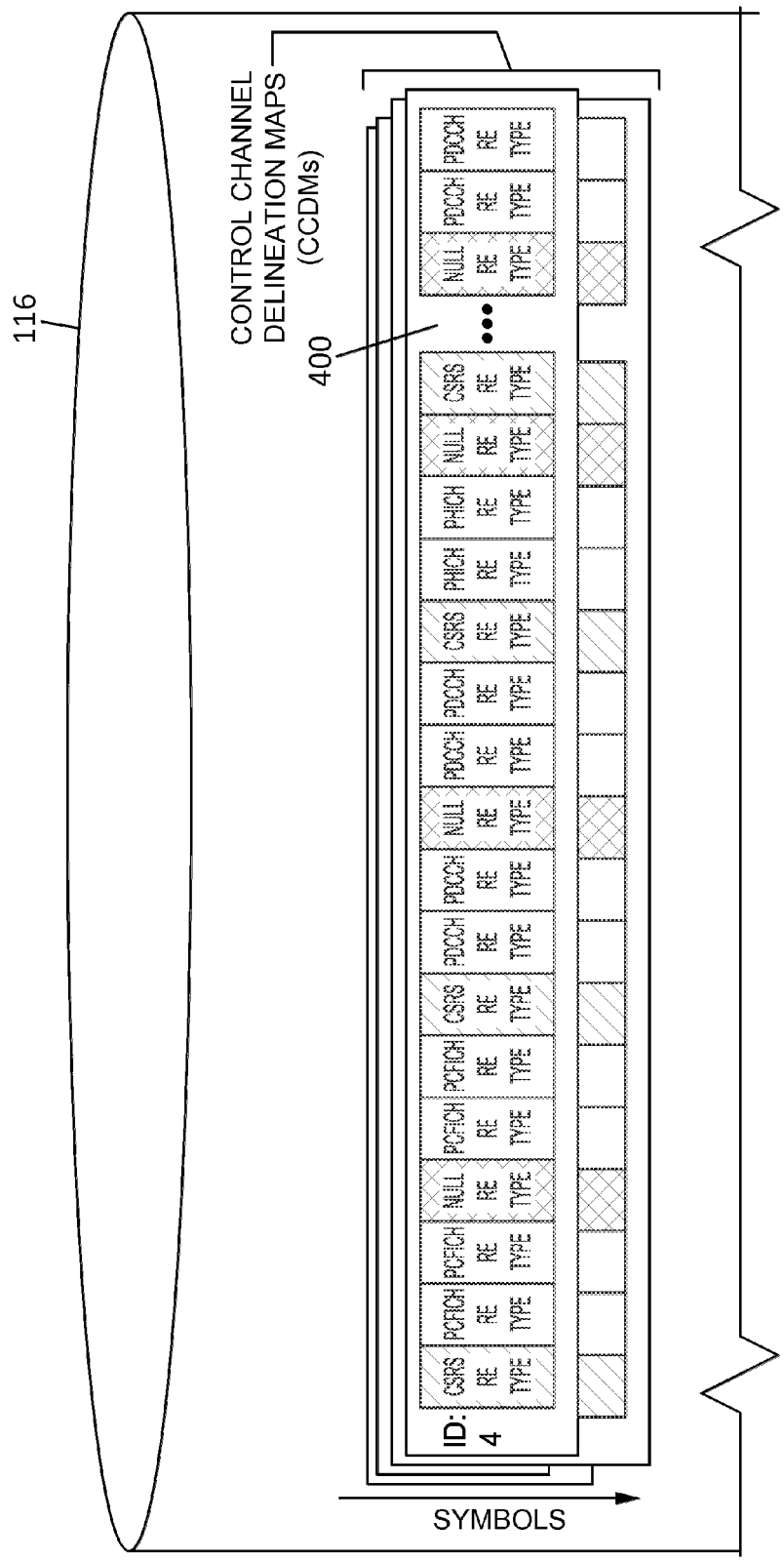

FIG. 4B

SHARED CHANNEL DELINEATION MAPS (SCDMs)

SHARED CHANNEL SKIN (1 RB X 14 SYMBOL)

402

116 (CTD)

| ID:8 | PDSCH RE TYPE | PDSCH RE TYPE | PDSCH RE TYPE | PDSCH RE TYPE | PDSCH RE TYPE | PDSCH RE TYPE | PDSCH RE TYPE | PDSCH RE TYPE | PDSCH RE TYPE | PDSCH RE TYPE | PDSCH RE TYPE | PDSCH RE TYPE |
|---|---|---|---|---|---|---|---|---|---|---|---|---|
| | PDSCH RE TYPE | PDSCH RE TYPE | PDSCH RE TYPE | PDSCH RE TYPE | PDSCH RE TYPE | PDSCH RE TYPE | PDSCH RE TYPE | PDSCH RE TYPE | PDSCH RE TYPE | PDSCH RE TYPE | PDSCH RE TYPE | PDSCH RE TYPE |
| | PDSCH RE TYPE | PDSCH RE TYPE | CSRS RE TYPE | PDSCH RE TYPE | PDSCH RE TYPE | PDSCH RE TYPE | PDSCH RE TYPE | PDSCH RE TYPE | CSRS RE TYPE | PDSCH RE TYPE | PDSCH RE TYPE | PDSCH RE TYPE |
| | PDSCH RE TYPE | PDSCH RE TYPE | PDSCH RE TYPE | PDSCH RE TYPE | PDSCH RE TYPE | PDSCH RE TYPE | PDSCH RE TYPE | PDSCH RE TYPE | PDSCH RE TYPE | PDSCH RE TYPE | PDSCH RE TYPE | PDSCH RE TYPE |
| | PDSCH RE TYPE | PDSCH RE TYPE | PDSCH RE TYPE | PDSCH RE TYPE | NULL RE TYPE | PDSCH RE TYPE | PDSCH RE TYPE | PDSCH RE TYPE | PDSCH RE TYPE | PDSCH RE TYPE | PDSCH RE TYPE | PDSCH RE TYPE |
| | PDSCH RE TYPE | PDSCH RE TYPE | PDSCH RE TYPE | PDSCH RE TYPE | PDSCH RE TYPE | PDSCH RE TYPE | PDSCH RE TYPE | PDSCH RE TYPE | PDSCH RE TYPE | PDSCH RE TYPE | PDSCH RE TYPE | PDSCH RE TYPE |
| | PDSCH RE TYPE | PDSCH RE TYPE | CSRS RE TYPE | PDSCH RE TYPE | PDSCH RE TYPE | PDSCH RE TYPE | PDSCH RE TYPE | PDSCH RE TYPE | CSRS RE TYPE | PDSCH RE TYPE | PDSCH RE TYPE | PDSCH RE TYPE |
| | NULL RE TYPE | NULL RE TYPE | NULL RE TYPE | NULL RE TYPE | NULL RE TYPE | PDSCH RE TYPE | PDSCH RE TYPE | PDSCH RE TYPE | PDSCH RE TYPE | PDSCH RE TYPE | PDSCH RE TYPE | PDSCH RE TYPE |

METHODS, SYSTEMS, AND COMPUTER READABLE MEDIA FOR PERFORMING LONG TERM EVOLUTION (LTE) CHANNEL DELINEATION

TECHNICAL FIELD

The subject matter described herein relates to testing communications networks. More specifically, the subject matter relates to methods, systems, and computer readable media for performing long term evolution (LTE) channel delineation.

BACKGROUND

Long term evolution (LTE) and other radio communications technologies can require significant infrastructure and configuration. Generally, network operators test various aspects of their network equipment to ensure reliable and efficient operation. Network operators typically simulate various conditions before equipment is deployed in a live network to decrease avoidable delays and/or other problems.

Various technical specifications, such as the 3rd Generation Partnership Project (3GPP) Technical Specifications 36.211, 36.212, 36.213, and 36.214, hereinafter respectively referred to as "TS 36.211", "TS 36.212", "TS 36.213", and "TS 36.214", define aspects of LTE communications. Generally, data from the network to a user device is referred to as downlink data and data from the user device to the network is referred to as uplink data. For example, user equipment (UE), such as a cellular mobile phone, may communicate with an enhanced or evolved Node B (eNode B) via the cellular radio transmission link. Data that is sent from the eNode B to the UE is downlink data, and data that is sent from the UE to the eNode B is uplink data.

Uplink and downlink LTE data is usually transmitted using one or more multiplexing and/or modulation schemes. For example, in some LTE networks, downlink data is transmitted using an orthogonal frequency-division multiplexing (OFDM) and uplink data is transmitted using single carrier frequency-division multiple access (SC-FDMA). Such schemes may allow multiple streams of data to be sent simultaneously (e.g., at different frequencies). While such schemes may allow data to be communicated at high-speed, significant processing is required to encode and decode the data. For example, an eNode B may perform channel coding, multiplexing, and interleaving of data and control streams, which are then sent to the UE over the air (RF) interface. After pre-processing the received signal from the eNode B, the UE may perform channel delineation for downlink physical channels and/or other baseband processing. After separating LTE data from various physical layer channels, the LTE data may be further processed.

Since LTE communications are generally complex and processing is time-sensitive, it is important for baseband processing to be performed quickly and efficiently. For example, in testing environments where multiple UEs may be simulated by a traffic simulator, performing baseband processing quickly and efficiently may present additional issues as a finite amount of resources may be shared during the baseband processing for the simulated UEs.

Accordingly, in light of these difficulties, a need exists for improved methods, systems, and computer readable media for performing LTE channel delineation.

SUMMARY

Methods, systems, and computer readable media for performing LTE channel delineation are disclosed. According to one method, the method includes storing a plurality of channel delineation maps in memory. The method further includes receiving downlink data from an LTE radio link. The method also includes identifying one of the channel delineation maps using the received data. The method further includes performing channel delineation on the data using a preconfigured channel delineation map.

A system for performing LTE channel data processing is also disclosed. The system includes a memory configurable for storing a plurality of channel delineation maps. The system also includes a communications interface configured to receive downlink data from an LTE radio link. The system also includes a processing module embodied in a non-transitory computer readable medium configured to identify one of the channel delineation maps using the received data and to perform channel delineation on the data using a preconfigured channel delineation map.

The subject matter described herein may be implemented in software in combination with hardware and/or firmware. For example, the subject matter described herein may be implemented in software executed by a processor. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the term "node" refers to a physical computing platform including one or more processors and memory.

As used herein, the terms "function" or "module" refer to hardware, firmware, or software in combination with hardware and/or firmware for implementing features described herein.

As used herein, the term "resource block" or "RB" may refer to an LTE radio frame portion or LTE data stored therein.

BRIEF DESCRIPTION OF THE DRAWINGS

The subject matter described herein will now be explained with reference to the accompanying drawings of which:

FIGS. 4A through 4C are a diagram illustrating exemplary channel delineation maps (CDMs) according to an embodiment of the subject matter described herein;

DETAILED DESCRIPTION

Figure 1:
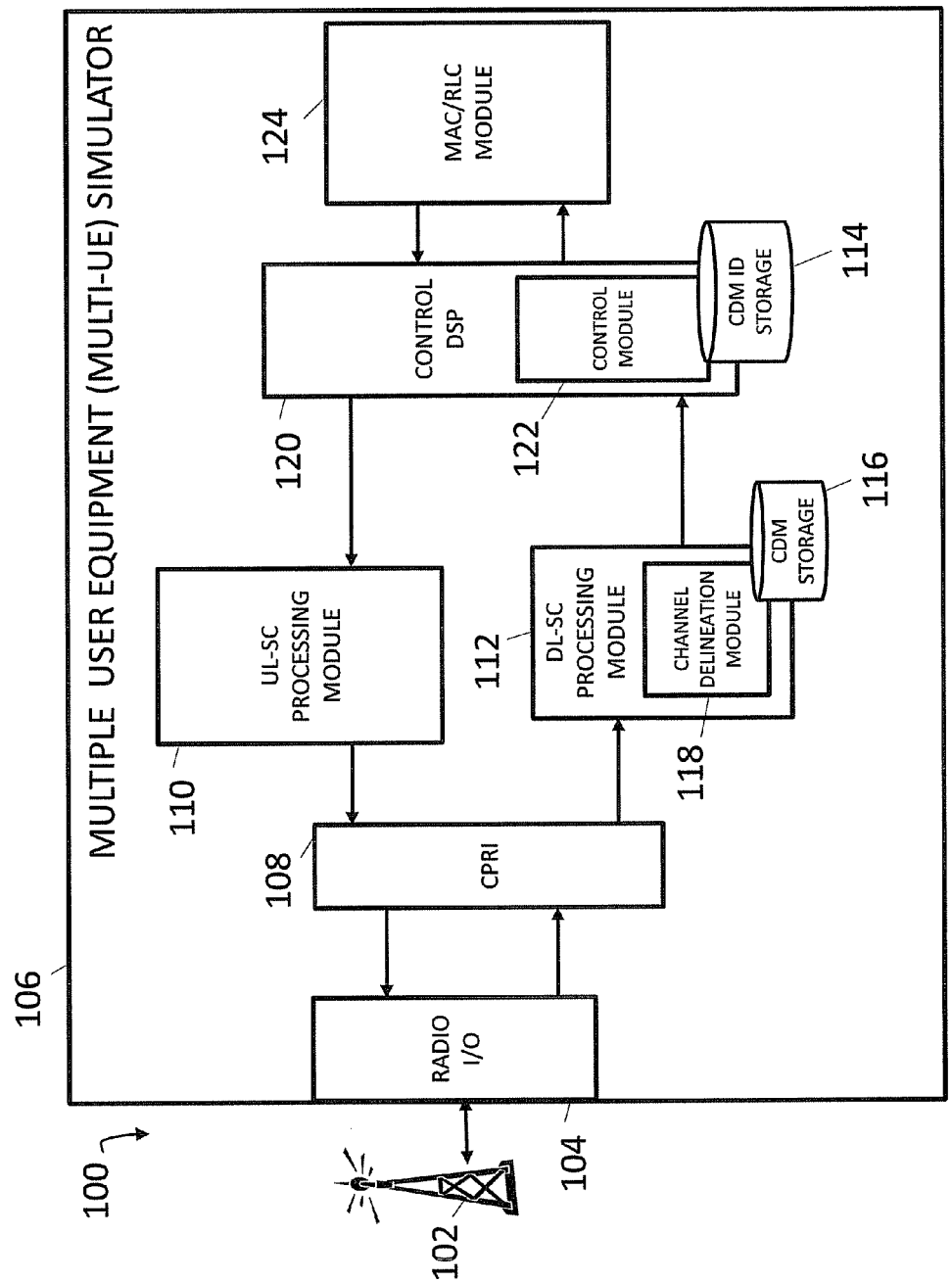
FIG. 1 is a diagram illustrating an exemplary device for performing LTE channel data processing according to an embodiment of the subject matter described herein.

The subject matter described herein discloses methods, systems, and computer readable media for performing LTE channel delineation. When testing LTE networks and/or other wireless communications network, it may be desirable to test the response of the network and other equipment under non-trivial load conditions. For example, it may be desirable to test communications between an eNode B by simulating multiple UEs simultaneously communicating with the eNode B.

In LTE systems, LTE data is usually transmitted between an eNode B and UEs via radio frames. Each radio frame generally has parts, such as subframes, that can contain large amounts of data. For example, in a 20 MHz transmission environment, a subframe may include a hundred resource blocks (RBs). RBs may generally be thought of as two-dimensional arrays of data portions called resource elements (REs). Each RB may contain various configurations or arrangements of REs. That is, each RB may have REs of different physical channels and signals. Moreover, an RB configuration may be different among RBs in a subframe, and RB configurations may also vary among subframes, e.g., based on traffic or network conditions.

Conventional LTE channel delineation solutions typically require complete decoding information to be generated and/or communicated to a delineation function prior to LTE channel data processing. For example, a downlink signaling chain (DL-SC) processing module may typically receive complete RB configurations from a control module for every subframe so that LTE data in each RB of the subframe is delineated and processed. Such conventional solutions may become increasingly complex as the number of UEs simulated increases. For example, a multi-UE simulator further complicates channel delineation because simulated UEs can share RBs in a subframe and can be operated in different transmission modes, each of which increases the number of potential RB configurations. As such, a multi-UE simulator may handle a greater number of different RB configurations than a single UE system, including some RB configurations that may be unique to the multi-UE environment. Hence, since complete decoding information for LTE data (e.g., RB configurations) has to be generated and provided for every subframe, conventional LTE channel delineation solutions would require a multi-UE simulator with substantial resources (e.g., processors, memory, and/or advanced traffic switching capability) which can be cost prohibitive.

Advantageously, the present subject matter described herein can be used to efficiently perform LTE channel delineation and can conserve various resources. For example, preconfigured channel maps, also referred to herein as channel delineation maps (CDMs), may identify or map resource elements (e.g., unique logical data portions of a LTE radio subframe) to corresponding physical channels and/or associated components (e.g., channel-specific buffers). Calculating specific locations of resource elements for each physical channel data is cumbersome because locations of specific channels may vary for each subframe received. By pre-defining and storing one or more CDMs inside a memory during a setup stage, channel delineation (e.g., separation of various channel data from an LTE radio subframe) or other LTE channel data processing may be performed efficiently. For example, by determining a "small set" of CDMs that can be used to define all possible combinations of RB configurations and storing these CDMs during a configuration or setup stage, a multi-simulator or component therein may use these maps when processing downlink LTE data. Hence, hardware and/or computational resource usage may be reduced because decoding information (e.g., RE configurations) are not constantly being generated and transmitted to a delineation function as subframes are received. In scenarios where multiple UEs are simulated, such improved resource utilization may be more desirable as a finite amount of resources is required to handle additional workloads relative to single UE implementations. Moreover, preconfigured CDMs may be identified based on known information stored in a subframe and/or based on some control data decoded and a CDM can be loaded from memory for decoding or de-mapping various subframes of various UEs. Hence, a multiple UE (multi-UE) simulator according to the present subject matter described herein may perform LTE channel data processing using significantly less resources than conventional solutions.

FIG. 1 is a diagram illustrating an exemplary LTE network 100 for performing LTE channel data processing according to an embodiment of the subject matter described herein. Network 100 may include an eNode B 102, a radio input/output (I/O) module (e.g., a radio head) 104, and a multi-UE simulator 106. ENode B 102 may represent any suitable entity (e.g., a base transceiver station (BTS), node B, etc.) for providing data via an air interface. For example, eNode B 102 may be an LTE mobile network entity having functionality similar to that of a radio network controller (RNC) and a base station (BS) in 2G networks or an RNC and a Node B in 3G mobile networks. In some embodiments, eNode B 102 may communicate directly with LTE UEs and is responsible for header compression, ciphering, reliable delivery of packets, admission control, and radio resource management. ENode B 102 may also communicate with various other modules and/or nodes, e.g., radio head 104 and/or multi-UE simulator 106.

Radio head 104 may represent any suitable entity for controlling and/or performing radio I/O functions; e.g., sending or receiving communications from eNode B 102 or multi-UE simulator 106. In some embodiments, radio head 104 may be distinct from or integrated with multi-UE simulator 106. Radio head 104 may perform analog-to-digital/digital-to-analog conversion. Radio head 104 may also include operation and management processing capabilities and a standardized optical interface to connect to one or more components. Radio head 104 may communicate using various communications protocols. For example, radio head 104 may be connected to multi-UE simulator 106 via a fiber optic cable using a common public radio interface (CPRI) protocol or may be connected via another interface or using other protocols. Data transmitted over a CPRI link may consist of digitized samples of the analog baseband signal, plus a low bandwidth control channel. Data carried over the CPRI link may be a continuous stream of numbers, representing the digitized samples of the baseband waveform. A CPRI connection may support several antennas, where each antenna may represent a sector or a multiple-input and multiple-output (MIMO) antenna.

Radio head 104 may also communicate with eNode B 102 using various protocols. For example, radio head 104 may receive or send data via an air interface using OFDM or SC-FDMA.

Multi-UE simulator 106 may be any suitable entity (e.g., a stand-alone node or distributed multi-node system) configured to simulate one or more LTE UEs, to send communications to eNode B 102, to receive communications from eNode B 102, and/or to test communications capabilities of eNode B 102. For example, multi-UE simulator 106 may be used for simulating network load conditions and analyzing performance of eNode B 102 and/or network nodes under the simulated conditions. In some embodiments, multi-UE simulator 106 may be a single node or may be distributed across multiple computing platforms or nodes. Multi-UE simulator 106 may include various modules for performing one or more aspects described herein. Multi-UE simulator 106 may include a CPRI module 108, an uplink signaling chain (UL-SC) processing module 110, a downlink signaling chain (DL-SC) processing module 112, a control digital signaling processing (DSP) module (control DSP) 120, and a medium access control and/or radio link controller (MAC/RLC) module 124. It will be appreciated that modules may include various components. For example, each of modules 108-124 may be a field-programmable gateway array (FPGA), an application-specific integrated circuit (ASIC), or software executing on a processor.

CPRI module 108 may be any suitable entity (e.g., a communications interface) for communicating with radio head 104 and/or other network entity via CPRI or other protocols. For example, CPRI module 108 may receive downlink data from radio head 104 via an LTE air interface. The downlink data may be transmitted using an OFDM signal. In another example, a wired connection (e.g., a fiber optic cable) may be used in communicating data between radio head 104 and CPRI module 108. On the downlink, CPRI module 108 may convert the LTE downlink data into digitalized data portions, such as frames or subframes. In some embodiments, CPRI module 108 may convert an OFDM signal and periodically (e.g., every seven micro seconds) or aperiodically (e.g., when data is available) provide a digitalized data portion to other modules, or sub-modules therein. Generally, receiving modules may attempt to process a digitalized data portion (e.g., a subframe) prior to another digitalized data portion being provided by CPRI module 108. On the uplink, CPRI module 108 may convert digitalized data portions, such as frames or subframes, into an SC-FDMA signal. CPRI module 108 may transmit the SC-FDMA signal towards eNode B 102 via radio head 104.

UL-SC processing module 110 may be any suitable entity (e.g., ASIC, FPGA or software executing on a processor) used in processing uplink data (e.g., simulated UE traffic data). For example, UL-SC processing module 110 may perform one or more aspects associated with uplink baseband processing for sending traffic towards eNode B 102. UL-SC processing module 110 may perform data integrity operations (e.g., generating and inserting cyclic redundancy check (CRC) values for transport data blocks or portions thereof), LTE channel data mapping or encoding, multiplexing operations, rate matching, interleaving, and/or other data processing.

DL-SC processing module 112 may be any suitable entity (e.g., ASIC, FPGA or software executing on a processor) used in processing downlink data (e.g., eNode B traffic data). For example, DL-SC processing module 112 may perform one or more aspects associated with downlink baseband processing for data transmitted from eNode B 102. DL-SC processing module 112 may perform data integrity operations (e.g., checking and removing CRC values), LTE channel data de-mapping or decoding, de-multiplexing operations, and/or other data processing.

In some embodiments, DL-SC Processing Module 112, or modules therein, may perform channel de-mapping or delineation using one or more CDMs. For example, LTE data (e.g., data portions of a radio subframe) may be associated with various LTE physical channels (e.g., channels at the physical layer). Data for particular channels may be noncontiguous and/or change relative locations often, e.g., every subframe. Channel delineation may involve identifying LTE data associated with particular LTE physical channels and/or providing the data to corresponding physical channels or buffers.

Exemplary LTE channels and/or signals may include a physical broadcast channel (PBCH), physical control format indicator channel (PCFICH), a physical downlink control channel (PDCCH), a physical hybrid ARQ indicator channel (PHICH), a physical downlink shared channel (PDSCH), a physical multicast channel (PMCH), a reference signal (RS), a cell-specific reference signal (CSRS), a primary synchronization channel (PSCH), a shared synchronization channel (SSCH), a physical uplink shared channel (PUSCH), a primary synchronization signal (PSS), a secondary synchronization signal (SSS), a physical uplink control channel (PUCCH), a sound reference signals (SRS), and demodulation reference signals (DMRS), a downlink channel, and/or an uplink channel.

DL-SC processing module 112 may include a resource de-mapping or channel delineation module 118 and/or include a CDM storage 116. CDM storage 116 may be any suitable entity (e.g., a database embodied or stored in a computer readable medium) for storing CDMs (e.g., channel delineation maps). CDM storage 116 may be located externally to or integrated with channel delineation module 118, DL-SC processing module 112, multi-UE simulator 106, or another module.

DL-SC processing module 112 or channel delineation module 118 may be used in symbol processing (e.g., control symbols and/or shared channel symbols). For example, channel delineation module 118 may read, access, or otherwise identify parameters stored in a radio subframe. DL-SC processing module 112 or channel delineation module 118 may use parameters or other variables for identifying control CDMs and/or for extracting control information. Exemplary variables may include a control symbol number parameter value, a PHICH group number (Ng) value, a bandwidth value (BW) value, a physical cell identity (ID), or a PHICH duration value.

In some embodiments, DL-SC processing module 112 or channel delineation module 118 may decode some channel data or resource elements prior to performing additional decoding operations. For example, PCFICH data may be decoded before some information (e.g., a control symbol number parameter value) is determinable. DL-SC processing module 112 or channel delineation module 118 may communicate with various other modules (e.g., Control DSP 120 and/or control module 122). For example, DL-SC processing module 112 may send signaling control information (e.g., downlink control information (DCI) and/or parameters to control module 122. Control module 122 may use the DCI to determine a CDM identifier that identifies a CDM for decoding downlink data on a shared downlink channel. Because the CDM contains channel delineation and decoding information for a plurality of channels, the CDM identified by control module 122 may be referred to herein as a SCDM. DL-SC processing module 112 or channel delineation module 118 may receive CDM identifiers from control module 122. For example, control module 122 may determine or identify, using received control information, a SCDM identifier and send the SCDM identifier to DL-SC processing module 112 or channel delineation module 118. After receiving a SCDM identifier, DL-SC processing module 112 or channel delineation module 118 may retrieve a corresponding SCDM and use the CDM in decoding shared channel data.

Control DSP 120 may be any suitable entity (e.g., ASIC, FPGA or software executing on a processor) configurable for controlling the overall operation of simulator 106, for simulating the LTE physical layer, and for processes uplink and downlink data to separate the data into data intended for upper layers and control information. For example, Control DSP 120 may perform one or more aspects associated with uplink baseband processing and/or downlink baseband processing. Control DSP 120 may perform data integrity operations (e.g., checking and removing CRC values), code segmentation, and/or other data processing. Control DSP 120 may also act as an access controller and may provide data to MAC/RLC module 124.

Control DSP 120 may include a control module 122. Control module 120 may receive control information associated with a data portion (e.g., a radio subframe). As stated above, control module 122 may determine a CDM identifier using at least a portion of the received control information and may send the channel delineation map identifier to DL-SC processing module 112 or channel delineation module 118. Control module 122 may determine an appropriate CDM identifier by querying a CDM ID storage 114 that includes control information (e.g., LTE network parameters) and associated CDM identifiers. CDM ID storage 114 may be stored in any suitable entity (e.g., a database or a data structure embodied in a computer readable medium). CDM ID storage 114 may be located externally to or integrated with control module 122, Control DSP 120, multi-UE simulator 106, or another module.

MAC/RLC module 124 may be any suitable entity (e.g., a processor) for performing various actions, such as interfacing with higher layers involved in LTE communications and data processing. For example, MAC/RLC module 124 may be a power QUICC III processor (PQ3). MAC/RLC module 124 may receive decoded downlink data and send the data to a media access control (MAC) layer. MAC/RLC module 124 may also receive uplink data (e.g., transport data blocks) from the MAC layer and perform radio link controller operations. The uplink data may be sent to other modules, e.g., DSP 120 and/or UL-SC processing module 110, for appropriate processing.

It will be appreciated that the above described modules are for illustrative purposes and that features or portions of features described herein may be performed by different and/or additional modules, components, or nodes. For example, aspects of channel delineation described herein may be performed by DL-SC Processing Module 112, channel delineation module 118, and/or other modules. In another example, storage 116 or 114 may be distributed or separated into two distinct modules or nodes.

Figure 2:
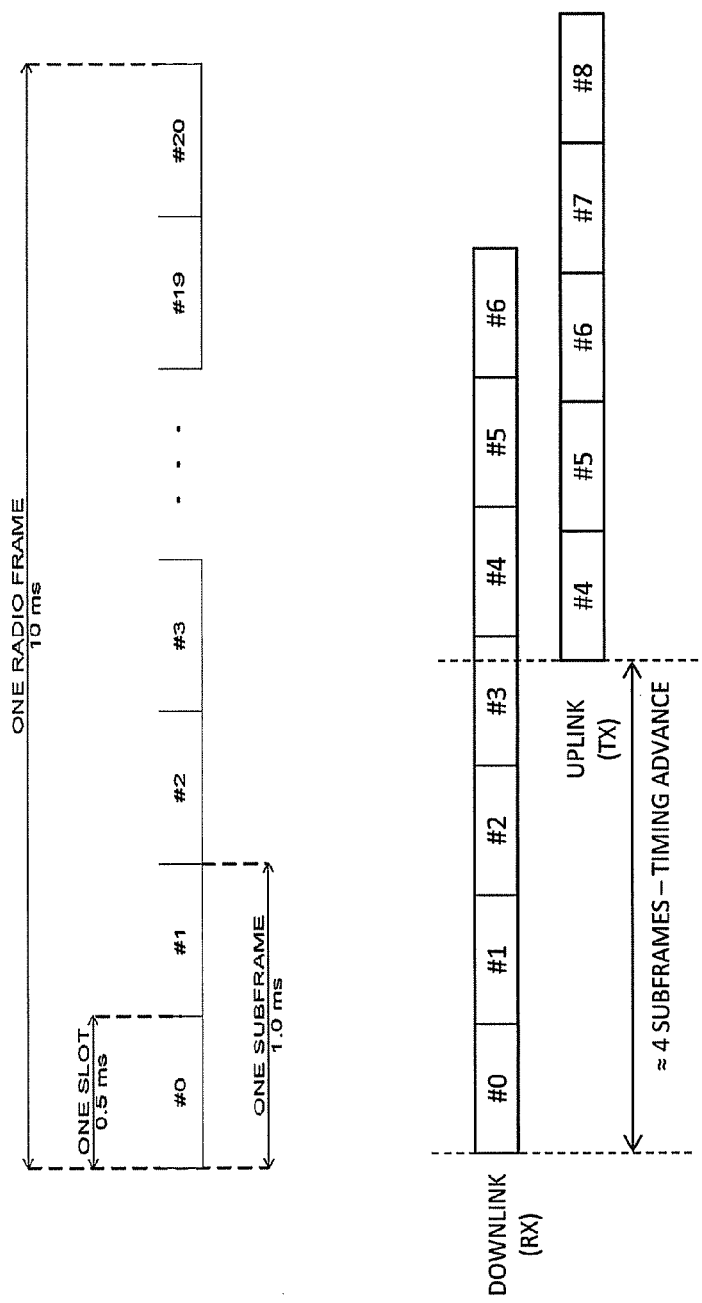
FIG. 2 is a diagram illustrating logical data portions of an LTE radio frame.

FIG. 2 is a diagram illustrating logical data portions of an LTE radio frame. As stated above, uplink and downlink data may be transmitted or sent in LTE radio frames, e.g., from eNode B 102 via radio head 104 to multi-UE simulator 106 or vice versa. Each LTE radio frame may be 10 milliseconds (ms) long comprising 10 subframes of 1 ms each. Each subframe may include 2 slots and/or 14 OFDM symbols. A slot may be 0.5 ms long and may include various amounts of LTE data. LTE data may be stored as modulated symbols in sub-carriers within an OFDM symbol. Each modulated symbol in a sub-carrier may typically represent two, four, or six bits. Sub-carriers may be data streams that are spaced 15 kilohertz apart from each other. A sub-carrier may typically carry data at a maximum rate of 15 kilosymbols per second (ksps). In some embodiments, a LTE downlink subframe may typically include multiple RBs (RBs) of 12 sub-carriers each, each sub-carrier with 14 OFDM symbols. The LTE downlink subframe may be partitioned into two equal downlink slots. Each downlink slot may include multiple blocks of 12 sub-carriers with 6 or 7 symbols per sub-carrier (e.g., depending on whether frame uses an extended cyclic prefix or a normal cyclic prefix).

FIG. 2 also depicts a timing difference between downlink and uplink data. In some embodiments, downlink control information (DCI) on subframe N is for PDSCH data in the same subframe. Downlink control information (DCI) on subframe N has scheduling or grant information for PUSCH in subframe N+4. Scheduling information may include grant information indicating certain RF components allocated for transmission or retransmissions for data associated with various UEs. This means that a user device may have about 4 ms from the start of the downlink signal to the start of transmission of the uplink signal. Within this time period, user device needs to perform downlink processing, decode the DCI, send the grant information to a higher layer, where a packet data unit (PDU) is segmented from the radio link control (RLC), get the packet data unit (PDU), also referred to herein as a TB, and do all physical layer uplink processing and perform SC-FDMA modulation for RF transmission on the uplink. For reasons that will be explained below, this timing constraint poses technical challenges not only to designers of user devices but also to designers of test equipment that simulates traffic from multiple user devices. Further, finite hardware and logic resources available for data communications may pose technical challenges for such test equipment when simulating multiple user devices.

Figure 3:
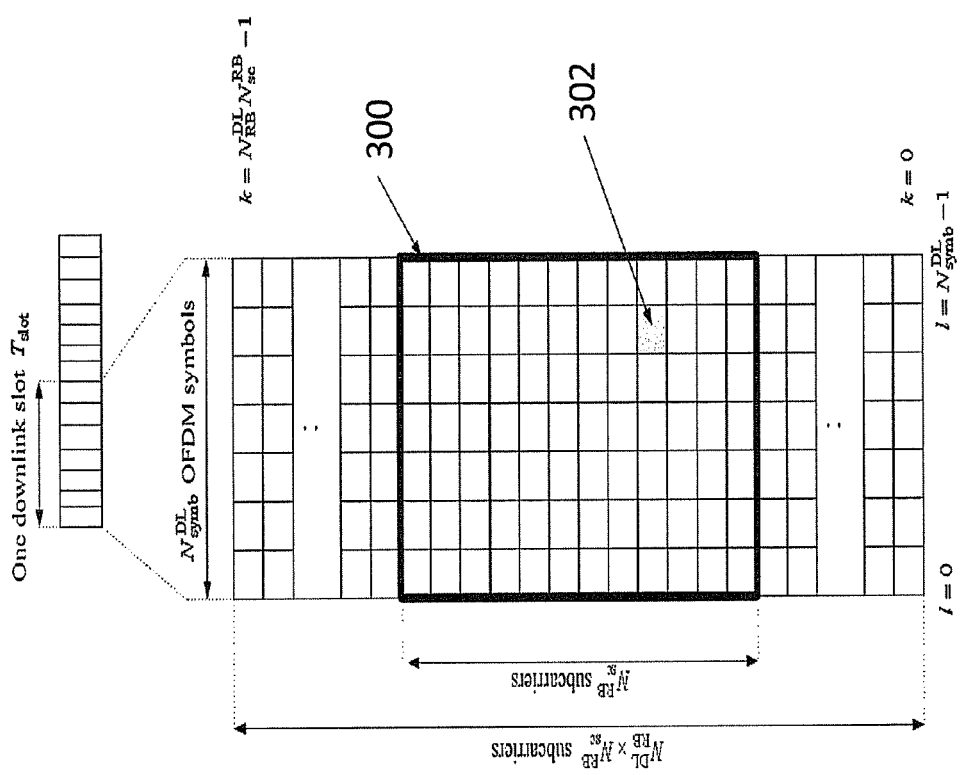
FIG. 3 is a diagram illustrating an exemplary resource element block portion.

FIG. 3 is a diagram illustrating an exemplary resource element block portion. A complete RB (RB) 300 may include 12 sub-carriers (e.g., data streams at different frequencies), each containing 14 symbols. For example, RB 300 may be logically thought of as a two-dimensional array of resource elements (REs). In FIG. 3, a portion (e.g., half) of a RB 300 is depicted. Resource element 302 represents a logical portion of RB 300. For example, complete RB 300 may include about 168 resource elements, e.g., 14*12=168, depending on cyclic prefix size and/or other variables. Resource element 302 may be data logically located at or identifiable by a unique combination of a time domain value and a sub-carrier or frequency domain value. For example, resource element 302 may include a modulated symbol (e.g., six bits of data) at time x on sub-carrier y.

Resource element 302 may include control information or data (e.g., payload information). In some embodiments, resource element 302 may be associated with a particular LTE channel. For example, the LTE physical layer defines physical channels or signals for carrying particular data (e.g., transport or payload data) and control information. Exemplary control channels or signals may include a PCFICH, a PDCCH, and/or a PHICH. In some embodiments, control channel data is located at or associated with one or more control symbols. For example, if a subframe has a single control symbol, control data will be stored in that symbol (e.g., symbol l=0 in RB 300) for each sub-carrier in the RB 300. In some embodiments, non-control symbols may include data associated with non-control (e.g., shared channel data) channels. Exemplary shared channel data channels or signals may include a PDSCH, a PMCH, an RS, a PSCH, an SSCH, and/or a PUSCH.

Figure 4C:
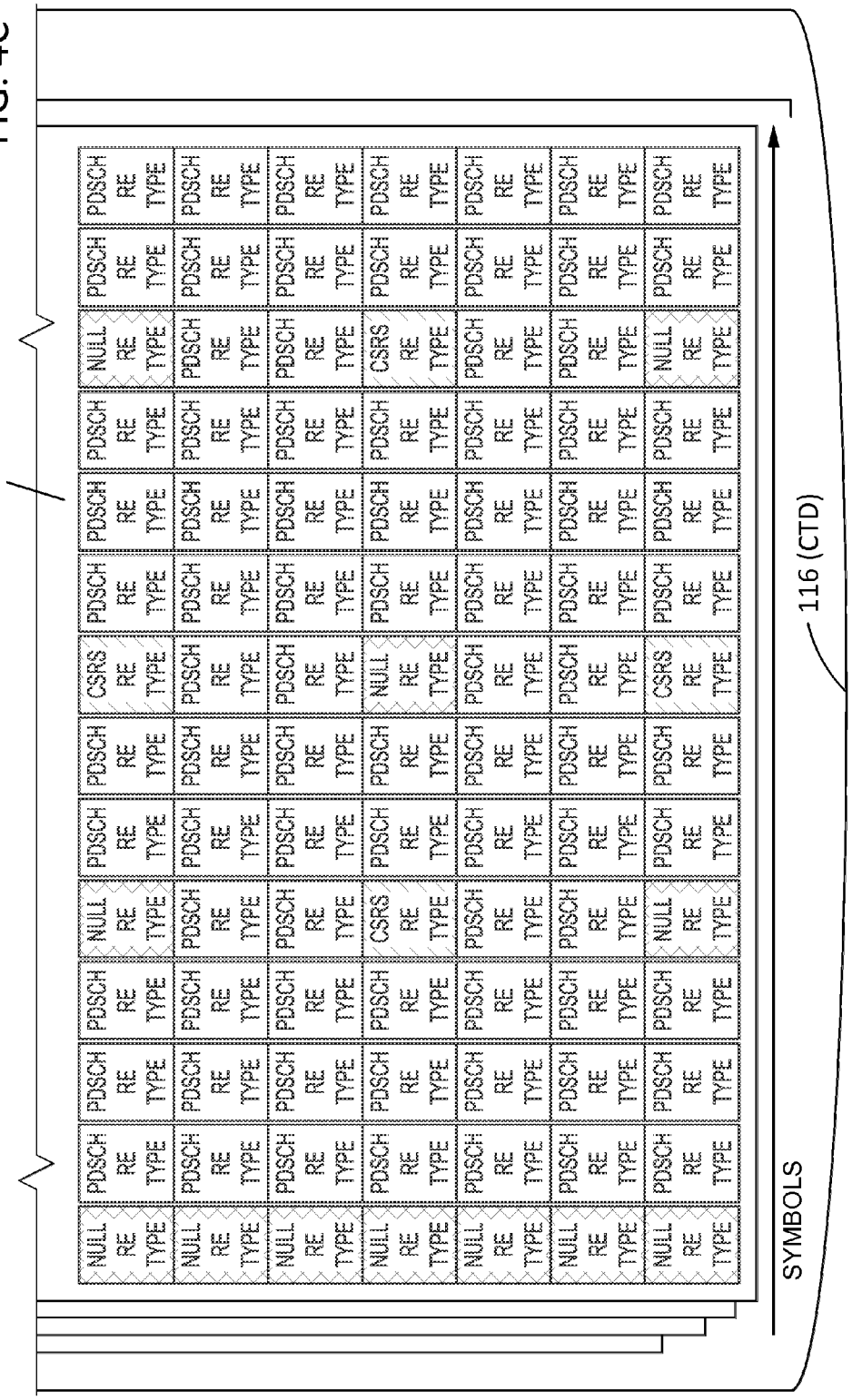

FIGS. 4A through 4C are a diagram illustrating exemplary CDMs according to an embodiment of the subject matter described herein. As stated above, location of channel data may vary among subframes and/or RBs within a subframe. For example, a resource element identified by (symbol x, sub-carrier y) in RB 'A' may be PDSCH data, while a resource element identified by (symbol x, sub-carrier y) in RB 'B' may be SSCH data. CDMs or channel delineation maps allow subframes having various resource element type configurations to be quickly and efficiently de-mapped. CDMs or channel delineation maps may be used in performing physical channel delineation and/or other LTE channel data processing.

In some embodiments, CDMs are analogous to RBs and may be thought of two-dimensional arrays of delineation information for decoding respective REs of RBs. In some embodiments, CDMs may be pre-computed and preconfigured at or during an initial phase (e.g., a network setup phase) based on system parameters such as bandwidth, a duplex mode (e.g., time-division duplexing (TDD) or frequency-division duplexing (FDD)), number of antennas, etc. In other embodiments, CDMs may be periodically or aperiodically (e.g., dynamically) generated. For example, one or more CDMs may be generated and stored if network parameters change or are modified by network operators.

CDM identifiers may be used to identify CDMs. For example, each CDM may have a unique CDM identifier (e.g., a unique number or combination of values). For example, a CDM identifier may be communicated (e.g., between modules, nodes, etc.) for identifying a CDM that is to be used in LTE channel delineation and/or data processing. In some embodiments, complete CDM index data (e.g., numerous CDM identifiers for numerous RBs) may be sent to processing module 112 or channel delineation module 118. For example, CDM indexes may be sent every subframe or TTI.

After determining a particular CDM, a control module may send a message including a CDM identifier to DL-SC processing module 112 or channel delineation module 118. This CDM identifier may be substantially smaller (e.g., a few bytes or less of data) than the mapping data it represents. In conventional implementations, sending messages providing complete decoding information for various subframes use a substantial amount of bus resources. The amount of bus resources utilized increase significantly in multiple UE scenarios and may cause data collisions as the number of simulated UEs increase. Hence, communications providing CDM IDs instead of complete decoding information according to the present subject matter described herein may be more efficient than conventional methods and, as such, fewer data collisions may occur when using shared bus resources.

Referring to FIGS. 4A through 4C, CDM storage 116 may include various channel delineation maps, such as a set of control channel delineation maps (CCDM) 400 and a set of shared channel delineation maps (SCDM) 402. CDM storage 116 may associate identifiers with CDMs and/or CDM sets. A CDM set may be one or more CDMs associated with a particular map configuration, such as number of control symbols in a subframe or other parameter values. Each CDM in a CDM set may have common characteristics, such as de-mapping filters or information for a same number of resource elements, while including a unique resource element type configuration. For example, one CDM in a CDM set may identify or map at least one resource element in a RB to an LIE channel that is different from other CDMs in the same set.

CDM storage 116 may include various CDM sets depending on network parameters and/or test configuration. For example, CDM storage 116 may include a control CDM set for subframes including one control OFDM symbol, a control CDM set for subframes including two control OFDM symbols, and a control CDM set for subframes including three control OFDM symbols. In another example, CDM storage 116 may include a shared CDM set for subframes including 13 shared physical channel OFDM symbols, a shared CDM set for subframes including 12 shared channel OFDM symbols, and a shared CDM set for subframes including 11 shared channel OFDM symbols.

In some embodiments, CDMs may be logically split into two different sets or set types: one for control channel only region (e.g., CCDMs) and another for control and data channels regions (e.g., SCDMs). CCDMs may be usable for decoding, de-mapping, or otherwise identifying control information associated with a particular control channel. CCDM 400 includes de-mapping information for a single control symbol (e.g., about 12 elements per RB). CCDM 400 is associated with a CDM ID of 4. CCDM 400 may be usable for de-mapping LTE control information into one or more LTE channels, e.g., a CSRS, a PCFICH, a PDCCH, and a PHICH. As depicted, additional CCDMs may be stored in CDM storage 116 and may include additional de-mapping information, such as mapping information for various amounts of control symbols and/or different resource element types and/or configurations.

SCDMs may be usable for decoding, de-mapping, or otherwise identifying data (e.g., payload data) associated with a particular shared channel. SCDM 402 includes de-mapping information for a 13 shared channel OFDM symbols (e.g., about 13*12 elements per RB). SCDM 402 is associated with a CDM ID of 8. SCDM 402 may be usable for de-mapping LTE payload data into one or more LTE physical channels, e.g., a PDSCH, a PMCH, an RS, a PSCH, an SSCH, and/or a PUSCH.

In some embodiments, there may be four or five resource elements types associated with a CDM. For example, resource elements may include data associated with a PDSCH, a PBCH, a PSCH, an SSCH, and an RS. In some embodiments, when performing channeling delineation for shared channels, resource elements types associated with a PSCH, an SSCH, and an RS may be ignored at some processing stages.

In some embodiments, a CDM index value may be encoded in a per-subframe or per-RB map (e.g., a channel delineation map or CDM). The CDM index value may become determinable after control information is decoded and RB allocation for each UE is fully known. For example, where shared channel data is decoded in a lower symbol to a higher symbol order, and from a lower subcarrier to a higher subcarrier for a given symbol, an appropriate CDM for decoding shared channel data may be selected based on a corresponding CDM index value.

As depicted, additional SCDMs may be stored in CDM storage 116 and may include additional de-mapping information, such as mapping information for various amounts of shared channels symbols and/or different resource element types and/or configurations.

Figure 5:
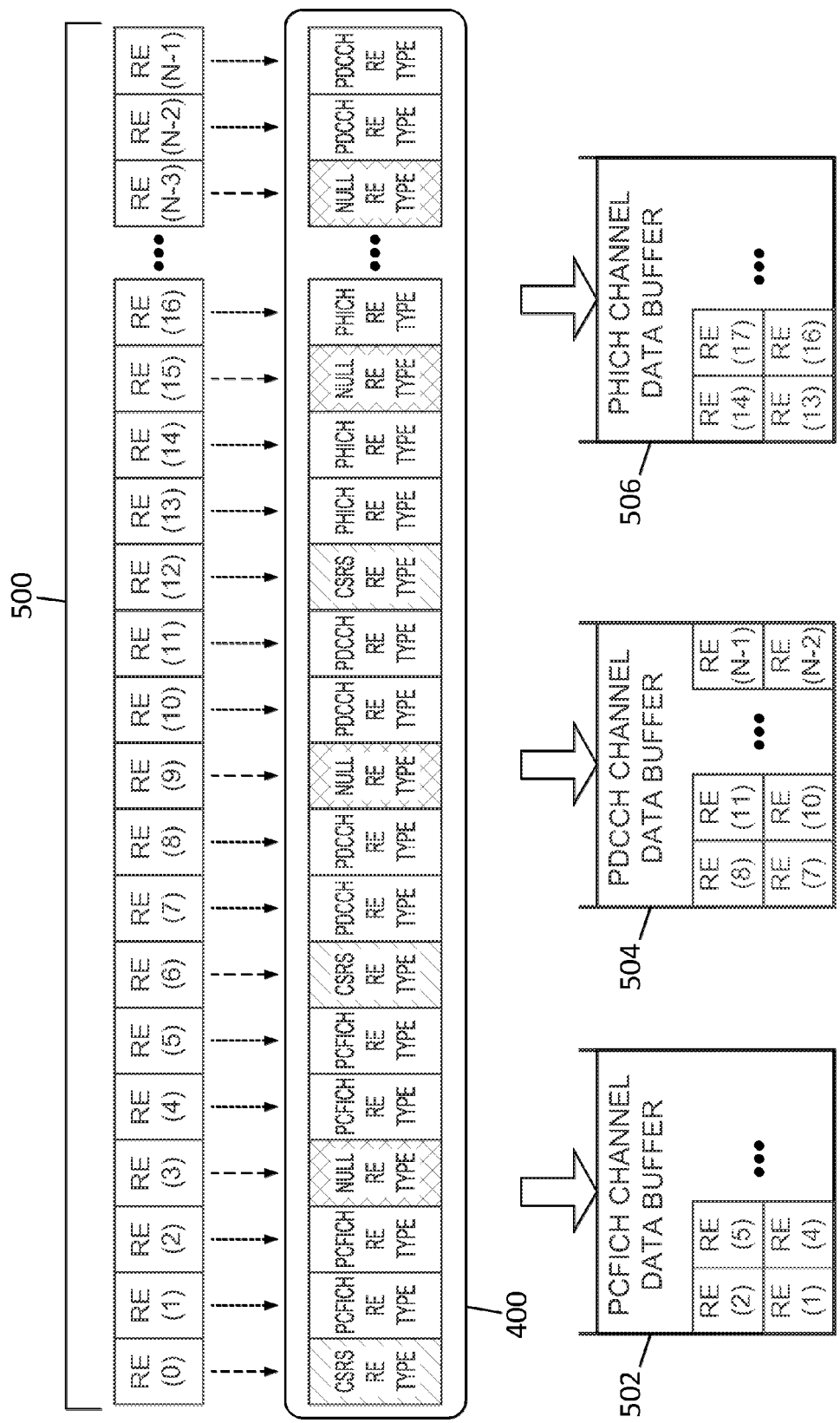
FIG. 5 is a diagram illustrating an exemplary channel delineation process using a control channel delineation map (CCDM) according to an embodiment of the subject matter described herein.

FIG. 5 is a diagram illustrating an exemplary channel delineation process using a CCDM according to an embodiment of the subject matter described herein. In this embodiment, an incoming data stream 500 of resource elements is matched to or filtered by a stream of corresponding elements from CCDM 400. Using CCDM 400, each resource element of stream 500 is decoded, de-mapped, or otherwise identified as associated with an LTE physical control channel. In some embodiments, after being decoded, certain RE data may be assigned, sent or provided to a PCFICH channel data buffer 502, a PDCCH channel data buffer 504, and a PHICH channel data buffer 506.

In some embodiments, elements or content from CCDM 400 may be used as a resource type filter. For example, each resource element in stream 500 may be assigned to a corresponding element from CCDM 400. Depending on the resource type identified by CCDM 400, certain resource elements, or data thereof, may be sent or provided to a corresponding control channel buffer. For example, after data is identified as associated with an LTE physical channel, the data may be further processed, ignored, or handled in some other manner.

As shown in FIG. 5, resource element (RE) (0) is identified as a CSRS resource type. RE (1) is identified as a PCFICH resource type. RE (2) is identified as a PCFICH resource type. RE (3) is identified as a NULL resource type. In this example, CSRS data and NULL data may be deleted or ignored at this stage of processing, while PCFICH data may be sent to PCFICH channel data buffer. In another method, CSRS data may be sent a function that does power and/or RF channel estimation. Additional resource elements of stream 500 may be filtered in a similar manner.

Figure 6:
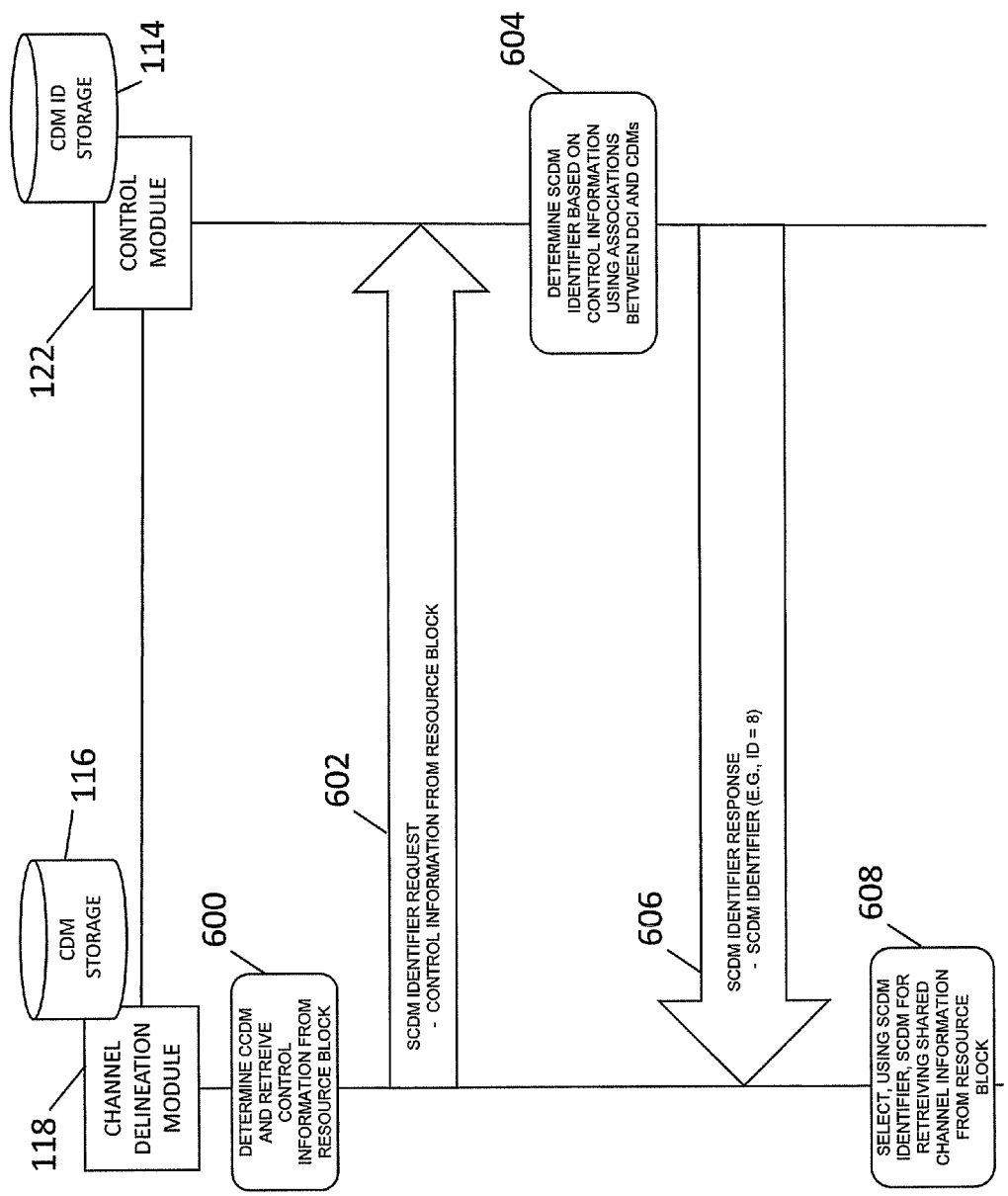
FIG. 6 is a diagram illustrating an exemplary messaging sequence for receiving a shared channel delineation map (SCDM) identifier according to an embodiment of the subject matter described herein.

FIG. 6 is a diagram illustrating an exemplary messaging sequence for receiving a SCDM identifier according to an embodiment of the subject matter described herein. At step 600, DL-SC processing module 112 or channel delineation module 118 may determine a CCDM (e.g., based on a control symbol number parameter and/or other parameters). Using the CCDM, DL-SC processing module 112 or channel delineation module 118 may de-map, retrieve, or otherwise gather control information from a RB.

In some embodiments, a control OFDM symbol number value (PCFICH data), an Ng value, a BW value, a physical cell ID, and/or a PHICH duration value may be usable to select an appropriate CCDM. For example, a channel encoder module may use these variables in assigning resource elements in a control symbol to one of the control channels. As such, using the same variables and knowledge of the assignment algorithm, de-mapping information may be determinable. In some embodiments, where a known, finite number of control channel assignments for resource elements is possible, CDM identifiers may be associated with corresponding resource element assignments or related variable information. After analyzing one or more of these variables, an appropriate CCDM may be selected by DL-SC processing module 112 or channel delineation module 118.

At step 602, a SCDM identifier (SMI) request message may be sent to control module 122. The SMI request message may include control information, such as information usable to determine RB allocation for each UE and/or other information usable to determine an appropriate SCDM.

At step 604, control module 122 may determine a SCDM ID using at least a portion of the received control information. For example, control module 122 may query CDM id storage 114 using the received control information and/or based on decoding and further processing of the received control information. In one method, the received control information may include PDCCH data. Similar to the process of selecting a CCDM, various control information may be usable to select an appropriate SCDM. For example, UL-SC processing module 110 may use control information (e.g., control parameter values) in assigning resource elements in a shared channel symbols to one of the shared channels. As such, using the same variables and knowledge of the assignment algorithm, de-mapping information may be determinable. In some embodiments, where a known, finite number of shared channel assignments for resource elements is possible, CDM identifiers may be associated with corresponding resource element assignments or related variable information. After querying CDM ID storage 114, an appropriate SCDM ID may be determined.

At step 606, a SMI response message may be sent to DL-SC processing module 112 or channel delineation module 118. The SMI response message may include the determined SCDM ID. By sending an SCDM ID instead of complete decoding information, shared resources, such as bus resources, are utilized more efficiently.

At step 608, DL-SC processing module 112 or channel delineation module 118 may select, using the received SCDM ID, a corresponding SCDM. For example, DL-SC processing module 112 or channel delineation module 118 may retrieve the appropriate CDM from CDM storage 116. Using the SCDM, DL-SC processing module 112 or channel delineation module 118 may de-map, retrieve, or otherwise gather data (e.g., payload or transport data) from the RB.

It will be appreciated that the above described processing sequence is for illustrative purposes. In some embodiments, a processing sequence may include additional and/or different processing sequences.

Figure 7:
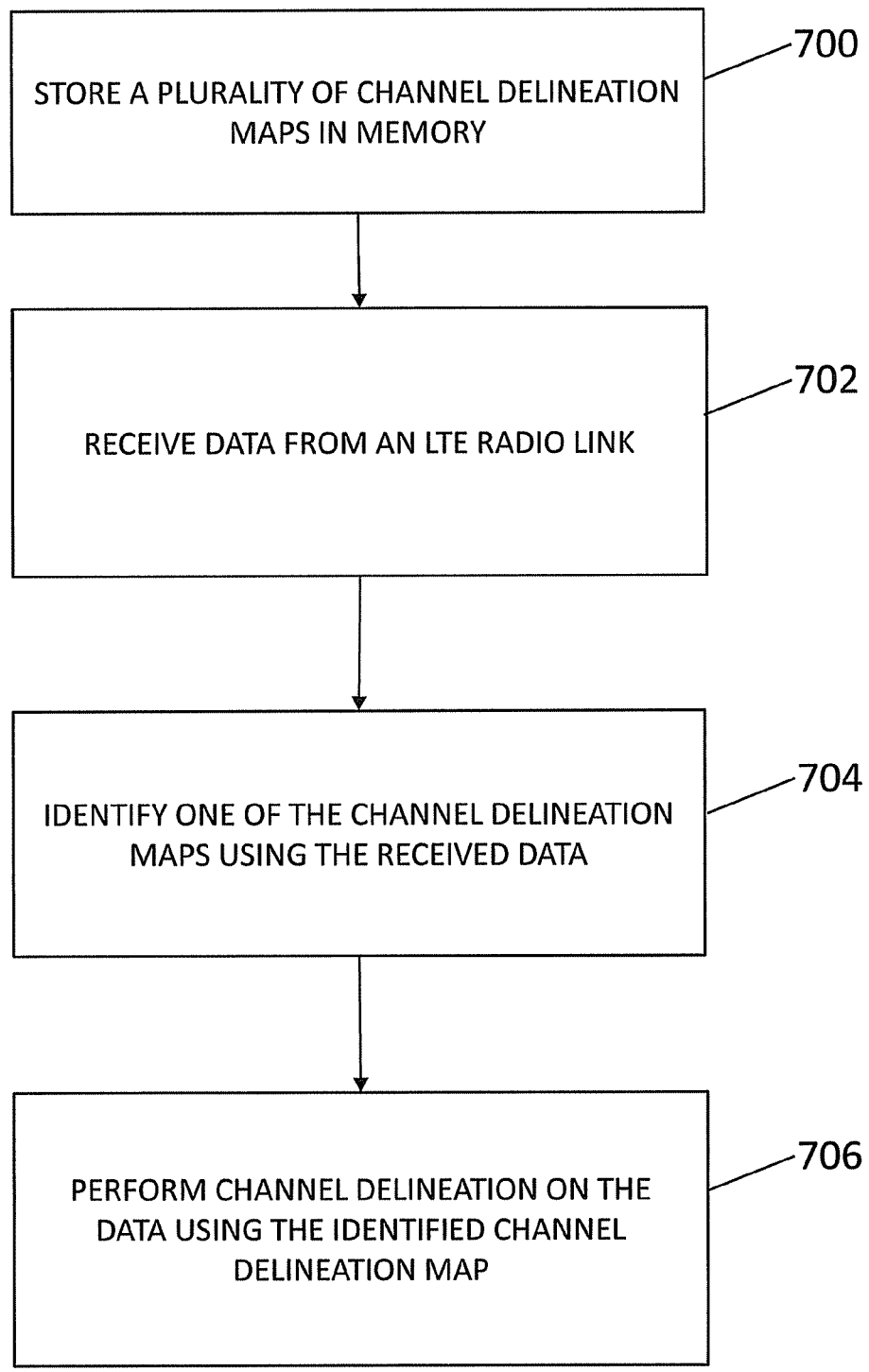
FIG. 7 is a diagram illustrating an exemplary process for performing LTE channel data processing according to an embodiment of the subject matter described herein.

FIG. 7 is a diagram illustrating an exemplary process for performing LTE channel data processing according to an embodiment of the subject matter described herein. In some embodiments, the exemplary process described herein, or portions thereof, may be performed by multi-UE simulator 106, DL-SC processing module 112, delineation module 118, and control module 122.

In step 700, a plurality of channel delineation maps may be pre generated and stored in memory. For example, one or more CDMs may be stored in CDM storage 116. In some embodiments, storing a plurality of channel delineation maps may include computing and storing the channel delineation maps during a setup phase.

In step 702, data from LTE radio link is received. For example, CPRI module 108 may send a radio subframe, or a portion thereof (e.g., a downlink or uplink slot), to DL-SC processing module 112 or channel delineation module 118. DL-SC processing module 112 or channel delineation module 118 may receive the radio subframe or the portion thereof.

In step 704, one of the channel delineation maps may be identified using the received data. For example, DL-SC processing module 112 or channel delineation module 118 may select a control CDM and/or data CDM based a control symbol number value and/or other information (e.g., an Ng value, a BW value, a physical cell ID, and/or a PHICH duration value).

In step 706, channel delineation is performed on the data using the identified channel delineation map. For example, DL-SC processing module 112 or channel delineation module 118 may select a control CDM based a control symbol number parameter value and/or other information. The selected control CDM may be used in assigning a plurality of resource elements or associated data into one or more corresponding channel buffers. In some embodiments, the identified channel delineation map may be a control CDM usable to determine control information from a RB associated with the received data.

In some embodiments, control information may be usable in determining a second channel delineation map. For example, control module 122 may receive control information from DL-SC Processing Module 112. Control module 122 may determine a channel delineation map identifier using at least a portion of the control information. Control module 122 may send the channel delineation map identifier to DL-SC processing module 112 or channel delineation module 118. At DL-SC processing module 112 or channel delineation module 118, the second channel delineation map may be selected using the received channel delineation map identifier. In some embodiments, the second channel delineation map may be a SCDM usable to identify resource elements associated with at least one LTE shared channel.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for performing long term evolution (LTE) channel data processing in a testing environment, the method comprising:
    storing a plurality of channel delineation maps in memory;
    receiving data from an LTE radio link;
    identifying one of the channel delineation maps using the received data; and
    performing channel delineation on the data using the identified channel delineation map, wherein
    the identified channel delineation map is preconfigured and identifies resource elements associated with one or more LTE physical channels, LTE reference signals, or LTE synchronization signals, wherein the resource elements are logical portions of the received data.

2. The method of claim 1 wherein each of the resource elements is uniquely identified by a frequency domain value and a time domain value.

3. The method of claim 1 wherein the at least one or more LTE physical channels, LTE reference signals, or LTE synchronization signals includes a physical broadcast channel (PBCH), physical control format indicator channel (PCFICH), a physical downlink control channel (PDCCH), a physical hybrid ARCS indicator channel (PHICH), a physical downlink shared channel (PDSCH), a physical multicast channel (PMCH), a reference signal (RS), a cell-specific reference signal (CSRS), a primary synchronization channel (PSCH), a shared synchronization channel (SSCH), a physical uplink shared channel (PUSCH), a primary synchronization signal (PSS), a secondary synchronization signal (SSS), a physical uplink control channel (PUCCH), a sound reference signals (SRS), or demodulation reference signals (DMRS), a downlink channel, or an uplink channel.

4. The method of claim 1 wherein storing a plurality of channel delineation maps includes computing and storing the channel delineation maps during a setup phase.

5. The method of claim 1 wherein computing a plurality of channel delineation maps is based on one or more: a system parameter, system bandwidth, a duplex mode, and a number of antennas used by the system.

6. The method of claim 1 wherein the identified channel delineation map is usable to determine control information from a resource block (RB) associated with the received data.

7. The method of claim 6 wherein the control information includes a parameter associated with one of: a PHICH group number (Ng) value, a bandwidth value (BW), a physical cell identity (ID), or a PHICH duration value.

8. The method of claim 6 wherein the control information is usable in determining a second channel delineation map.

9. The method of claim 8 wherein determining the second channel delineation map includes sending the control information to a control module and, at the control module:
    receiving the control information,
    determining a channel delineation map identifier using at least a portion of the control information, and
    sending the channel delineation map identifier to the channel delineation module.

10. The method of claim 9 wherein the second channel delineation map is selected using the received channel delineation map identifier, wherein the second channel delineation map is usable to identify resource elements associated with at least one LTE shared channel.

11. The method of claim 1 wherein performing channel delineation on the data includes assigning a plurality of resource elements into one or more corresponding channel buffers.

12. A system for long term evolution (LTE) channel data processing in a testing environment, the system comprising:
    a memory configurable for storing a plurality of channel delineation maps;
    a communications interface configured to receive data from an LTE radio link; and
    a channel delineation module embodied in a non-transitory computer readable medium configured to identify one of the channel delineation maps using the received data and to perform channel delineation on the data using the identified channel delineation map, wherein the identified channel delineation map is preconfigured and identifies resource elements associated with one or more LTE physical channels, LTE reference signals, or LTE synchronization signals, wherein the resource elements are logical portions of the received data.

13. The system of claim 12 wherein each of the resource elements is uniquely identified by a frequency domain value and a time domain value.

14. The system of claim 12 wherein the at least one or more LTE physical channels, LTE reference signals, or LTE synchronization signals includes a physical broadcast channel (PBCH), physical control format indicator channel (PCFICH), a physical downlink control channel (PDCCH), a physical hybrid ARQ indicator channel (PHICH), a physical downlink shared channel (PDSCH), a physical multicast channel (PMCH), a reference signal (RS), a cell-specific reference signal (CSRS), a primary synchronization channel (PSCH), a shared synchronization channel (SSCH), a physical uplink shared channel (PUSCH), a primary synchronization signal (PSS), a secondary synchronization signal (SSS), a physical uplink control channel (PUCCH), a sound reference signals (SRS), or demodulation reference signals (DMRS), a downlink channel, or an uplink channel.

15. The system of claim 12 wherein storing a plurality of channel delineation maps includes computing and storing the channel delineation maps during a setup phase.

16. The system of claim 12 wherein computing a plurality of channel delineation maps is based on one or more: a system parameter, system bandwidth, a duplex mode, and a number of antennas used by the system.

17. The system of claim 12 wherein the identified channel delineation map is usable to determine control information from a resource block (RB) associated with the received data.

18. The system of claim 16 wherein the control information includes a parameter associated with one of: a PHICH group number (Ng) value, a bandwidth value (BW), a physical cell identity (ID), or a PHICH duration value.

19. The system of claim 12 comprising:
    a control module configured to receive control information from the channel delineation module, determine a channel delineation map identifier using at least a portion of the control information, and send the channel delineation map identifier to the channel delineation module.

20. The system of claim 19 wherein the channel delineation module is configured to select a second channel delineation map using the received channel delineation map identifier, wherein the second channel delineation map is usable to identify resource elements associated with at least one LTE shared channel.

21. The system of claim 12 wherein performing channel delineation on the data includes assigning a plurality of resource elements into one or more corresponding channel buffers.

22. A non-transitory computer readable medium comprising computer executable instructions embodied in a computer readable medium that when executed by a processor of a computer to control the computer in a testing environment, to perform steps comprising:
- storing a plurality of channel delineation maps in memory;
- receiving data from an LTE radio link;
- identifying one of the channel delineation maps using the received data; and
- performing channel delineation on the data using the identified channel delineation map, wherein the identified channel delineation map is preconfigured and identifies resource elements associated with one or more LTE physical channels, LTE reference signals, or LTE synchronization signals, wherein the resource elements are logical portions of the received data.

* * * * *